United States Patent
Stauder et al.

(10) Patent No.: US 10,169,886 B2
(45) Date of Patent: Jan. 1, 2019

(54) METHOD OF MAPPING SOURCE COLORS OF AN IMAGE INTO A TARGET COLOR GAMUT OF A TARGET COLOR DEVICE IN TWO MAPPING STEPS

(71) Applicant: THOMSON LICENSING, Issy les Moulineaux (FR)

(72) Inventors: Jurgen Stauder, Montreuil/Ille (FR); Jonathan Kervec, Paimpont (FR); Philippe Robert, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 279 days.

(21) Appl. No.: 14/953,011

(22) Filed: Nov. 26, 2015

(65) Prior Publication Data
US 2016/0155245 A1 Jun. 2, 2016

(30) Foreign Application Priority Data
Nov. 27, 2014 (EP) .................................... 14306896

(51) Int. Cl.
G06T 11/00 (2006.01)
G06T 11/40 (2006.01)
H04N 1/60 (2006.01)
H04N 9/67 (2006.01)

(52) U.S. Cl.
CPC ............ G06T 11/001 (2013.01); G06T 11/40 (2013.01); H04N 1/6058 (2013.01); H04N 9/67 (2013.01)

(58) Field of Classification Search
CPC .. G09G 5/02; G09G 5/06; H04N 9/67; H04N 1/6058; G06T 11/001
See application file for complete search history.

(56) References Cited

U.S. PATENT DOCUMENTS

| 6,724,507 B1 | 4/2004 | Ikegami et al. |
| 6,934,053 B1* | 8/2005 | Mestha ................ H04N 1/6033 358/1.9 |
| 9,756,337 B2* | 9/2017 | Li ......................... H04N 19/136 |
| 2003/0012427 A1* | 1/2003 | Martinez-Uriegas ....................... G06T 11/001 382/162 |
| 2010/0188672 A1* | 7/2010 | Bernal ................... H04N 1/409 358/1.9 |

(Continued)

FOREIGN PATENT DOCUMENTS

| EP | 1641244 | 3/2006 |
| EP | 2023601 | 2/2009 |
| EP | 2066110 | 6/2009 |

OTHER PUBLICATIONS

Montag et al—"Gamut mapping: evaluation of chroma clipping techniques for three destination gamuts"—IS&T/ SID 6th Color and Imaging Conference, Scottsdale, Nov. 1998, pp. 57-61.

(Continued)

*Primary Examiner* — Todd Buttram
(74) *Attorney, Agent, or Firm* — Tutunjian & Bitetto, P.C.

(57) ABSTRACT

Method comprising:
first mapping, in a reference color space, said source colors from a source color gamut into a reference color gamut, resulting in intermediate colors,
second mapping said intermediate colors from said reference color gamut into said target color gamut, resulting in target colors forming at least one mapped image, wherein said first mapping is defined through information representing said second mapping.

8 Claims, 5 Drawing Sheets

(56) References Cited

U.S. PATENT DOCUMENTS

2012/0307266 A1* 12/2012 Yu .................. H04N 1/6058
358/1.9
2015/0194117 A1* 7/2015 Cho .................. G09G 3/3685
345/691

OTHER PUBLICATIONS

Braun et al—"Image Lightness Rescaling Using Sigmoidal Contrast Enhancement Functions"—Proceedings of SPIE Electronic Imaging Conference ; Jan. 26-29, 1999; pp. 1-39.
Kang etal.—"Color decomposition method for multiprimary display using 3D-LUT in linearized LAB space"—Proceedings of the SPIE vol. 5667 No. 1; pp. 354-363—Jan. 28, 2005.
Han—"Real time gamut mapping architecture and implementation for color blind people"—APCHI 2004 : Asia Pacific conference on computer human interaction No. 6, Jun. 29, 2004, vol. 3101, pp. 133-142.
Zolliker etal—"On the Continuity of Gamut Mapping Algorithms"—Proc. SPIE 5667, Color Imaging X: Processing, Hardcopy, and Applications, 220 (Jan. 28, 2005); ; pp. 1-14.
Search Report dated May 21, 2015.

\* cited by examiner

METHOD OF MAPPING SOURCE COLORS OF AN IMAGE INTO A TARGET COLOR GAMUT OF A TARGET COLOR DEVICE IN TWO MAPPING STEPS

This application claims the benefit, under 35 U.S.C. § 119 of European Patent Application No. 14306896.3, filed Nov. 27, 2014.

TECHNICAL FIELD

The invention concerns a method of color mapping between different color gamuts.

BACKGROUND ART

In imaging workflows like cinema production workflow, broadcasting and digital imaging, color correction is an important step. For example, color correction is applied to raw film material after production to compensate for unwanted illumination color. Color correction is applied at the final phase of cinematographic post-production in order to realize specific moods according to the artistic intent of the director of photography. Color correction is also applied to photographs, scanned paintings or graphics before printing on paper. Color correction can be applied to images of a video content, to a single image of this video content, to still images or even for parts of such images, e.g. an object in an image.

Color corrections may include for example an increase of saturation, a change of color hue, a decrease of red tones or an increase of contrast. Color correction can be global to the whole of an image, to a set of images, to a specific region in one single image or even to all image regions in several images of a video content corresponding to a specific semantic unit.

During the process of color correction of images, the color operator has generally to keep in mind what will be the impact of the applied color correction on the target display device that will be used for the final reproduction of images. The following examples illustrate this problem. In case of digitalization of painting arts, a painting is photographed by a multispectral camera and then color corrected using a personal computer (PC). The operator verifies the applied color correction on the monitor of the PC while the final reproduction will be printing on paper. In this case, the PC monitor is the mastering display device used for the production of images and the paper printer is the target display device used to the final reproduction of images. Another example starts with the capture of images on argentic film. The film is then scanned, and then color corrected using a dedicated high-resolution color correction device. The color operator verifies the applied color correction on a high definition control monitor while the final color reproduction will be performed using a projector run on a printed film. Here, the control monitor is the mastering display device and the film printer and film projector are the final reproduction device. In another case, broadcast content in mastered on a high grade mastering monitor to be reproduced on the screen of consumer TV set.

Color characteristics differences between the mastering display device used for the production of images and the target display device used for final reproduction of these images should also be taken into account during color correction. Such differences may have an impact for instance on hue, saturation, contrast, intensity, dynamic range, and/or color gamut.

A solution to compensate for such differences of color characteristics is based on color management (CMM). Generally, to implement CMM, the color characteristics of the mastering display device and of the final target display device are measured, mathematically modelled and then, the differences of color characteristics are compensated using color transformations based on these mathematical models. CMM takes notably into account the color gamut of the devices. The color gamut describes the totality of reproducible colors of a display device. When an image to transform contains colors outside of the color gamut of a display device or close to the border of this gamut, the color transformation is adapted to map these colors inside this gamut, including the border of this gamut. Such a color transformation is then called color gamut mapping.

In general, color gamut mapping maps colors from a source color gamut into a target color gamut. The source color gamut can be content-dependent or device-dependent. When it is content-dependent, it generally means that all colors of the image(s) to map defines itself a source color gamut. When the source color gamut is device dependent, it is linked to device. Such a device can be a capture device such as camera or scanner. Such a device can be a mastering display device used to produce the image to map. The source color gamut can also be predefined, for instance according to a standard such as ITU-R BT.709. The target color gamut can be linked to a target display device used for the reproduction of images, such as a paper or a film printer, a projector or a TV set as already mentioned above. Such device comprises for instance LCD, OLED displays as those integrated in cell phones, tablets or TV sets. The target color gamut can also be predefined in a standard, as for example a standard used for transmission, compression and/or storage of images, for example ITU-R BT.709.

Generally, colorimetric color reproduction and non-colorimetric color reproduction are distinguished. Colorimetric color reproduction aims to reproduce colors on a target display device such that their colorimetry is identical or as close as possible to the colorimetry of these colors as displayed on a reference display device. The colorimetry of a color is measured in a colorimetric device-independent color space, as, for instance CIE XYZ color space. On the opposite, gamut mapping, by principle, involves non-colorimetric color reproduction since some of the colors are mapped, i.e. transformed. Non-colorimetric color reproduction can be guided by a series of criteria, compensating for the change of colorimetry, as, for instance, the preservation of color appearance, of contrast and/or of saturation.

Colors can be mapped along mapping trajectories anchored on anchor points defined in a given color space. As a compromise for minimization of loss in contrast and loss in saturation, colors can be mapped along straight lines as mapping trajectories. See for instance Montag and Fairchild in their paper entitled "Gamut mapping: Evaluation of chroma clipping techniques for three destination gamuts" published in 1998 at the IS&T/SID Sixth Color Imaging Conference in Scottsdale. The way how colors are mapped along such straight lines correspond for instance to a linear compression, a clipping, or, more complex, to non-linear functions as S-shaped functions.

SPECIFIC BACKGROUND

A specific situation concerns images with large color gamut or so-called high dynamic range content. For example, UDHTV content uses RGB color coordinates for red, green and blue, respectively, that are encoded according to a standard, namely ITU-R BR.2020, that corresponds to a standard display device, taken as a reference. The RGB color coordinates span a standard, or reference, color space that is limited by the standard, or reference, color gamut. The colors of UDHTV content are represented by color coordinates in this standard, or reference, color space and they are included in this large color gamut defined by this standard.

When images of a UDHTV content are produced and mastered by a colorist using a mastering display device having a color gamut smaller than the large color gamut defined by this standard (and generally included in this large gamut), the part of the large gamut that is not included in the color gamut of the mastering display device is not used at all for the encoding of the colors of such images. For CMM, we have now a situation with three color gamuts: First, the color gamut of the mastering display device. Second, the large encoding color gamut of the standard. Third, the target color gamut of the target display device used for the reproduction of the UDHTV content.

If the UHDTV content is delivered directly, without color transformation, to the target display device, the CMM of the target display device will consider the large encoding color gamut of the standard as the source color gamut of the content, reducing therefore the range of colors from the source color gamut to the generally smaller color gamut of the target display device. If the color gamut of the target display is larger than the source color gamut, the range of colors from the source color gamut is extended to the color gamut of the target display device. Both cases may occur, depending on the colors. For example, it might be that blue colors are extended in color gamut and red colors are reduced in color gamut.

A similar situation occurs for high dynamic range (HDR) content. HDR content will be created and proof viewed on a HDR mastering display device, but then the RGB coordinates of the mastered colors will generally be encoded using a floating point format. This format has a very large range. Similarly to the situation above, if the HDR content is delivered directly, without color transformation, to the target display device, the CMM of the target display device will consider the dynamic range of the HDR standard as the dynamic range of the source content, reducing therefore the dynamic range to the generally smaller dynamic range of the target display. If the dynamic range of the target display is larger than the dynamic range of the encoding standard, the dynamic range of colors is extended to the dynamic range of the target display device. Both cases may occur, depending on the colors. For example, it might be that blue colors are extended in their dynamic range and red colors are reduced in their dynamic range.

One solution to avoid the reduction of the range of colors reproduced by a target display device when displaying a content encoded within a color gamut that is—at least for some colors—larger than the color gamut of a mastering display device used to produce this content would be to send metadata related to the color gamut of this mastering display device to the target device in order to allow the CMM integrated in this target display device to take into account the difference between the color gamut of the encoding standard and the color gamut of the mastering display device. For example, the target display device may apply a specific color transform that takes into account the difference between the color gamut of the encoding standard and the color gamut of the mastering display device.

But as the mastering display device used to produce a content may be different from a content to another one, or even from one sequence of images to another one of the same content, the target display device should have computational resources large enough for re-computing this specific color transformation fast enough when the metadata changes. But, generally, a target display device has limited computational resources.

SUMMARY OF INVENTION

An objective of the invention is notably to avoid the above drawbacks.

For this purpose, the subject of the invention is a method of, in a color mapper, mapping source colors of at least one image into a target color gamut of a target color device, comprising:

first mapping, in a reference color space, said source colors from a source color gamut into a reference color gamut, resulting in intermediate colors, second mapping said intermediate colors from said reference color gamut into said target color gamut, resulting in target colors forming at least one mapped image, wherein said first mapping is defined through information representing said second mapping.

Instead of having the first mapping defined through information representing the second mapping, the first mapping is defined along mapping trajectories that are those of the second mapping.

A first advantage of such a color mapping method is that, because the reference color gamut and the target color gamut are independent of the content to map, independent of the color gamut of this content and independent of its dynamic range, the second mapping can be precalculated or pre-defined through a parametric model. Such a pre-calculation allows advantageously lowering the computational resources required to implement the method.

The source color gamut is generally content dependent, notably in the sense that it depends of the actual color gamut of the content to map, and/or in the sense that it depends on the color gamut of a display device used to produce this content, namely a mastering display device. For instance, in a scenario of broadcasted content, the user may switch from a content channel to another one and the new content of the other channel might have been generated using another mastering display device than the content of the previous channel. Another example of variation of source color gamut during the display of content is related to content comprising difference scenes that are mastered using different mastering display devices having different color gamuts.

When the source color gamut is content-dependent, the definition of the first mapping needs to be computed in real time. As the first mapping of the color mapping method above is defined through information representing the second mapping, and/or defined along mapping trajectories that are those of the second mapping, a second advantage of this color mapping method is that the first mapping requires only low computational resources. It means that this first mapping can be easily calculated in real time as required when the source color gamut changes from image to image, or from a sequence of images to another sequence of images, or from a content channel to another one. Additionally, notably when the first mapping is defined along mapping trajectories that are those of the second mapping, such a definition of the first mapping ensures advantageously at least a similar quality for the first mapping as compared to the second mapping.

Still another advantage of the mapping method above is that it can avoid the reduction of the range of colors reproduced by the target display device when displaying a content of images encoded within a reference color gamut that is—at least for some colors—larger than the source color gamut.

When the reference color gamut is used for encoding colors of images to be delivered and displayed by the target display device and is—at least for some colors—larger than the source color gamut of these images, the part of the large reference color gamut that is not included in the source color gamut is not used at all for the encoding of the colors of these images. And when these colors would have been delivered directly, without color mapping, to the target display device, the CMM of the target display device would have considered the large encoding reference color gamut as the source color gamut of the content, reducing therefore the range of colors reproduced by this target display device when displaying these images. Advantageously, thanks to the mapping method above, this reduction can be avoided, allowing to better take advantage of the whole target color gamut, and colors of the images, when mapped according to the method above, can better fits the entire gamut capabilities of the target display device than without such a mapping.

Preferably, said reference color space and said reference color gamut are those of a reference color device. This reference color device is notably characterized by a forward reference color transform and/or by an inverse reference color transform, that may be used, before the first mapping, to transform representation of source colors provided in a source color space into representation in the reference color space, and, after the second mapping, to transform representation of mapped colors provided in the reference color space into representation in the target color space.

Preferably, the reference color space, the reference color gamut, and, if any, the reference color device are defined in a standard, as for instance the ITU-R BT.709 standard or the ITU-R BT.2020 standard.

Preferably, said first mapping and said second mapping are both implemented in said reference color space. That then means that both mappings use the representation to represent a color to map and a mapped color. The representation of a color is generally based on three color coordinates representing this color in the color space. It means that the above information defining the second mapping and/or the above mapping trajectories of this second mapping can be advantageously directly reused to define the first mapping, then still decreasing the computational resources needed to define the first mapping.

Preferably, said information representing said second mapping are the mapping trajectories of said second mapping, and the first mapping is also defined along mapping trajectories that are those of the second mapping.

It means that the mapping trajectories defining the second mapping can be advantageously directly reused to define the first mapping, then decreasing the computational resources needed to define the first mapping.

If a mapping trajectory defining said second mapping of a color is used for said second mapping in a given direction, it will be preferably used in the opposite direction for the first mapping.

Preferably, said second mapping is defined by a LUT comprising a series of pairs of input colors and corresponding output colors representing said colors in said reference color space, wherein each of these pairs having an input color and a corresponding output color defines a mapping trajectory for the second mapping of this input color and for the first mapping of this output color.

For any color to second map that does not correspond to an input color of said LUT, usual interpolation techniques between mapping trajectories having input colors closest to said color to second map are used to compute the second mapped color. Similarly, for any color to first map that does not correspond to an output color of said LUT, usual interpolation techniques between mapping trajectories having output colors closest to said color to first map are used to compute the first mapped color.

Preferably, said first mapping is performed such that at least one of said intermediate colors does not belong to said source color gamut. Generally, in such a situation, the first color mapping corresponds for at least one of said intermediate colors to a color gamut expansion.

Preferably, said second mapping is performed such that at least one of said intermediate colors does not belong to said target device color gamut. Generally, in such a situation, the second color mapping corresponds to a color gamut compression for the at least one of said intermediate colors.

A subject of the invention is also a method of displaying at least one image on a target display device having a target color gamut, comprising:
  receiving source colors of said at least one image represented in a reference color space associated with a reference color gamut,
  mapping said source colors from a source color gamut into said target color gamut according to the mapping method above, resulting in target colors represented in said reference color space,
  transforming said representation of these target colors in said reference color space into representations of the same colors in the target color space of said target display device,
  controlling said target display device by said target colors as represented in said target color space.

An advantage of the invention is that the color mapper, beside mapping source colors from said source color gamut to the target color gamut, also transforms the color coordinates representing target colors in the reference color space into target color coordinates representing the same target colors in the target color space of the target display device, i.e. into target color coordinates configured to control the target display device such that it can actually display these targets colors. Color coordinates representing colors in the reference color space can be defined for instance according to the video system or video standard that are used for transmission and reception of source colors, for example ITU-R BT.709 or ITU-R BT.2020. Such reference color coordinates are generally not suitable to control directly a target display device having color characteristics different than the reference display device defined in such a standard.

Preferably, the first mapping from said source color space into said reference color space is defined in dependence to said source color gamut in real time during said displaying, and the second mapping from said reference color space into said target color space is predefined before said displaying. Such a predefinition of the second mapping may take notably the form a pre-calculated LUT.

A subject of the invention is also a color mapper configured for mapping source colors of at least one image from a source color gamut of said source colors into a target color gamut of a target color device, comprising:
  a first module configured for first mapping, in a reference color space, said source colors from said source color gamut into a reference color gamut, resulting in intermediate colors,
  a second module configured for second mapping said intermediate colors from said reference color gamut into said target color gamut, resulting in target colors forming at least one mapped image, wherein said first mapping is defined through information representing said second mapping.

Preferably, said information representing said second mapping are the mapping trajectories of said second mapping, and the first mapping is also defined along mapping trajectories that are those of the second mapping.

A subject of the invention is also a display device for displaying at least one image, having a target color gamut, comprising:
- a receiver configured to receive source colors of said at least one image represented in a reference color space,
- a color mapper as described above, configured for mapping said source colors in target colors represented in said reference color space, from a source color gamut of said source colors into said target color gamut,
- a color transformer configured for transforming the representation of said targets colors in said reference color space into a representation of the same targets colors in the target color space of said target display device,
- a controller for controlling said display device by said target colors represented in said target color space such as to display said target colors.

BRIEF DESCRIPTION OF DRAWINGS

The invention will be more clearly understood on reading the description which follows, given by way of non-limiting example and with reference to the appended figures in which.

DESCRIPTION OF EMBODIMENTS

It is to be understood that the mapping method according to the invention may be implemented in various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a computer platform comprising any suitable architecture. Such a combination of hardware and software may then be named "color mapper". Preferably, the computer platform hosting this color mapper has hardware such as one or more central processing units ("CPU"), memories such as a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit. This computer platform may be part of a display device, itself integrated on a TV set, a cell phone, or a tablet. This computer platform may be part of a set-top-box or of gateway.

We will now describe an embodiment of the mapping method of the invention in the situation of a content of images produced on a mastering display device and then encoded according to the BT.2020 standard having a color gamut, named "reference color gamut", which is—at least for some colors—larger than the color gamut of the mastering display device, named source color gamut.

In this embodiment, we considered that the BT.2020 images are received by the receiver of, for instance, a TV set. This TV set comprises what is named a target display device characterized by a target color gamut and a target inverse transform able to transform any color coordinates representing a color in the CIE 1931 XYZ color space into color coordinates representing approximately the same color in the RGB color space of this target display device. Instead of a TV set, a set top box can be used as a receiver, which is connected to a LCD as target display device.

Figure 2:
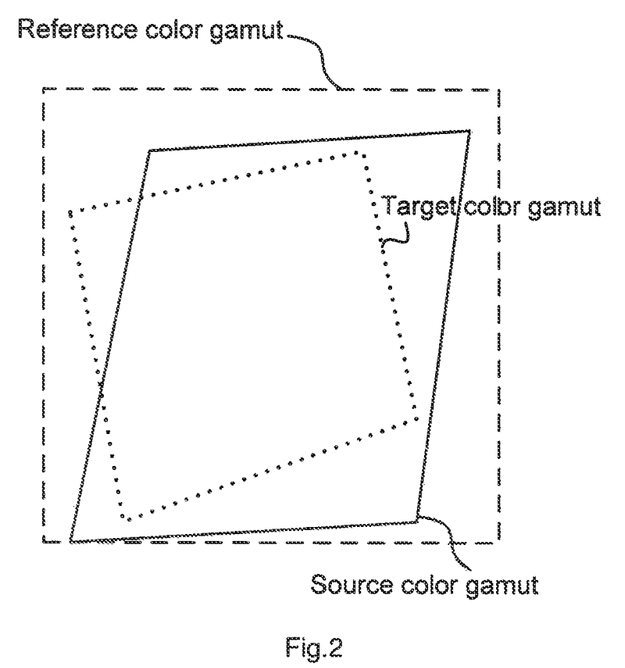
FIG. 2 shows the three different color gamuts that are used to implement the main embodiment illustrated on FIG. 1.

All these color gamuts are represented on FIG. 2 in the BT.2020 color space. Data descripting these color gamuts are for instance provided in a manner known per se to the color mapper under specific Gamut Boundary Descriptors (GBD). If the GBD of the reference color gamut is provided in the color space of the mastering display device, it is converted in a manner known per se into a GBD in the reference color space, namely BT.2020 color space. If the GBD of the target color gamut is provided in the color space of the target display device, it is converted in a manner known per se into a GBD in the reference color space, namely BT.2020 color space.

We consider that GBDs describing the different color gamuts, data describing the target inverse transform, data describing a BT.2020 source forward transform able to transform any color coordinates representing a color in the BT.2020 color space into color coordinates representing approximately the same color in the CIEXYZ color space, are stored in a memory of the computer platform hosting the color mapper. Before being stored on this memory, some of these data may be received by the computer platform through the receiver, or stored in advance in a memory of the computer platform.

The aim of the embodiment of the mapping method of the invention that will be now described is to reproduce colors of the images on the TV set, these colors being received under data representing them by their color coodinates in the BT.2020 color space. Such colors as received are named "source colors".

Figure 1:
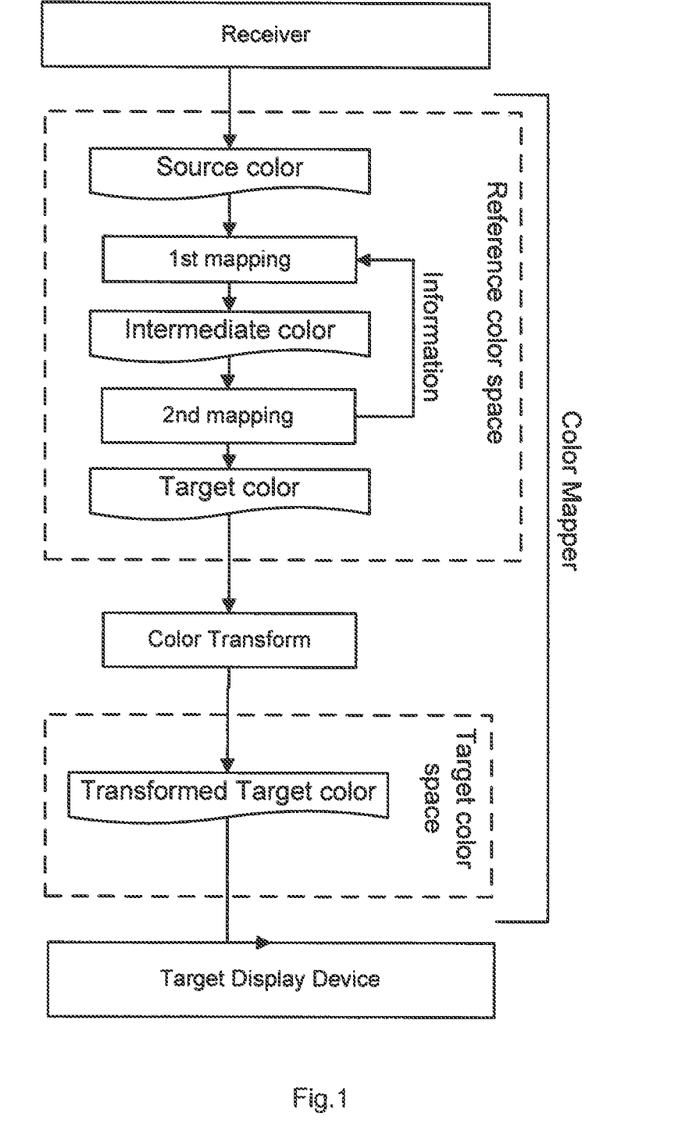
FIG. 1 is a diagram illustrating a main embodiment of the invention.
Figure 3:
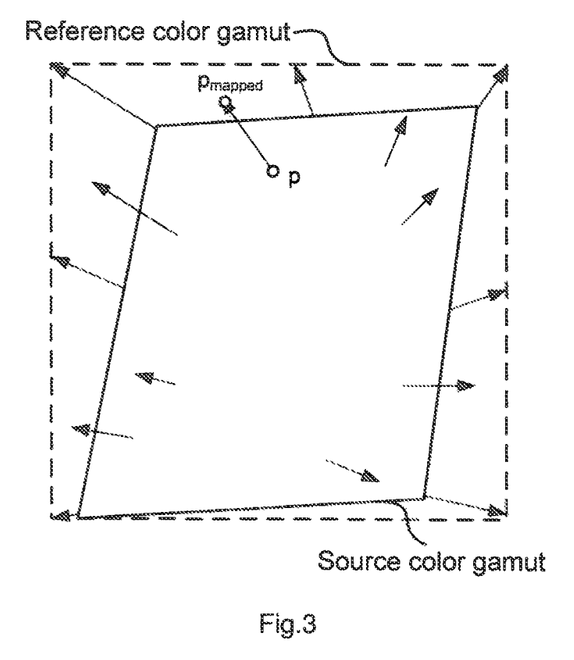
FIG. 3 illustrates the first mapping of the main embodiment illustrated on FIG. 1.
Figure 4:
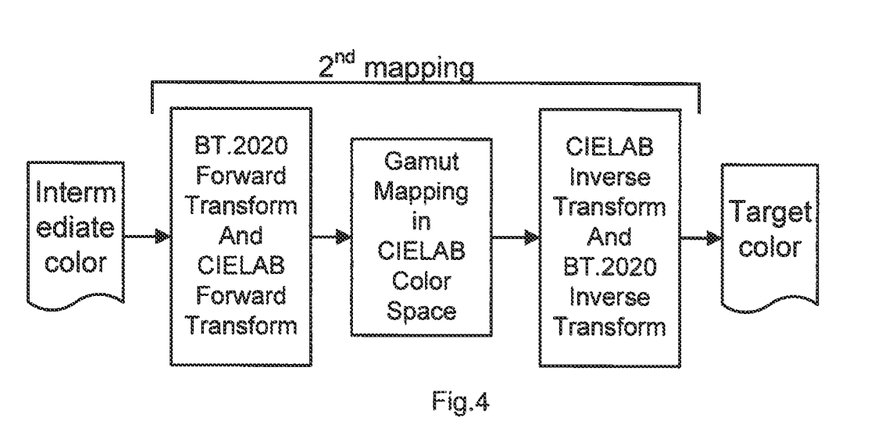
FIG. 4 is a diagram detailing the second mapping of the main embodiment illustrated on FIG. 1.
Figure 5:
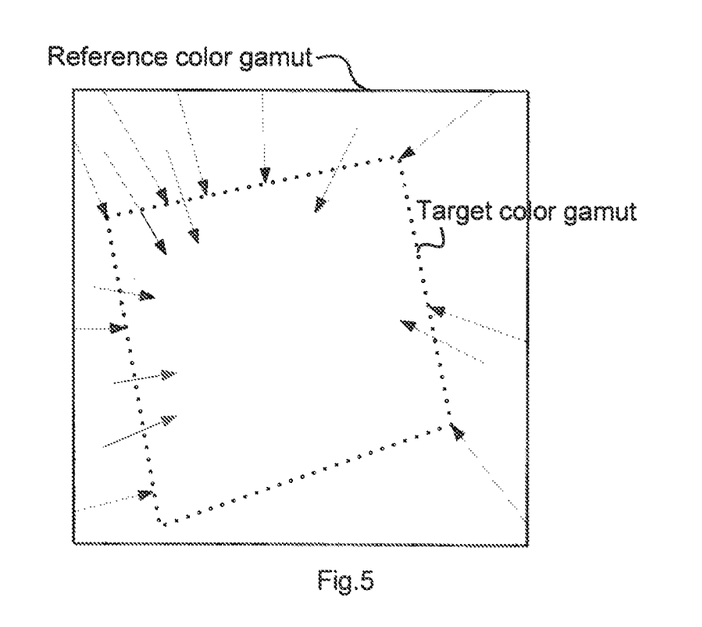
FIG. 5 illustrates the second mapping of the main embodiment illustrated on FIG. 1.
Figure 6:
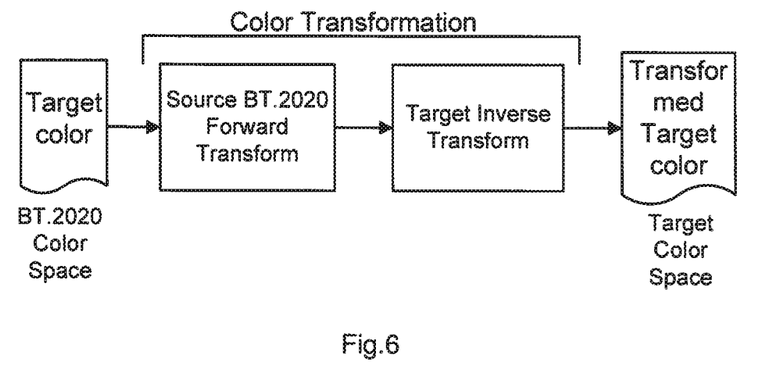
FIG. 6 is a diagram detailing the color transform step of the main embodiment illustrated on FIG. 1.

The embodiment of the mapping method according to the invention will be described in reference to the flowchart of FIG. 1, showing three steps:

a first step, illustrated on FIG. 3, corresponding to a first mapping, in the BT.2020 color space, of these source colors from the source color gamut, here the color gamut of the mastering display device, into the reference color gamut, here the BT.2020 color gamut, resulting in intermediate colors; as shown by the arrows on FIG. 3, this mapping corresponds to an expansion of the color gamut; preferably, this first mapping is defined such that the mapped colors of the received images fill out the whole reference color gamut. This is advantageous because then the reference color gamut can be considered as color gamut of the mapped colors. In a variant, the first mapping may correspond to a compression of the color gamut;

a second step, illustrated on FIGS. 4 and 5, corresponding to a second mapping, in the BT.2020 color space, of these intermediate colors from the reference color gamut, here the BT.2020 color gamut, into the target color gamut, resulting in target colors represented by their color coordinates in the BT.2020 color space; as shown by the arrows on FIG. 5, this mapping corresponds to a compression of the color gamut; in a variant applicable notably when the target color gamut is larger than the reference color gamut, the second mapping may correspond to an expansion of the color gamut;

a third step, illustrated on FIG. 6, corresponding to a color transformation of the target colors adapted to represent these target colors in the target color space, i.e. notably by specific color coordinates.

Then, as shown on FIG. 1, the obtained color coordinates representing these transformed colors in the target color space are directly sent to control the target display device. As being controlled by these color coordinates, the target display device reproduces the source colors received by the receiver.

As a whole, the first two steps are advantageously processed in the same color space, namely the reference color space, here the BT.2020 color space. The third step corresponds to a classical change of color space for the representation of the colors that allows controlling the target display device for the reproduction of the received BT.2020 images.

An advantage of the method as notably embodied here is that all three steps have an input color signal that is compliant with the same standard, here UHDTV. Steps 1 and 2 even output a color signal that is also compliant with this standard.

The second and the third steps above are device-dependent and not dependent on data related to the source color gamut or to the dynamic range of the content. In other words, the second and the third steps do not depend on the mastering display device. The definition of the second step does not depend on data related to the source color gamut or to the dynamic range of the content, notably because it relies only on the GBDs describing the reference color gamut and the target color gamut that both do not depend on the source colors. The definition of the third step is based on the inverse target transform and on forward source transform that both do not depend on the data related to the source color gamut or to the dynamic range of the content. As this second and the third steps are device-dependent and not dependent on the data nor the color gamut nor the dynamic range of the content, their definition can be pre-computed in advance and stored in a memory of the computer platform, for instance in the form of Look-Up-Tables—LUTs, for instance LUT1 for the second mapping and LUT2 for the color transform.

On the opposite, as the mastering display device used to produce a content to be reproduced on the TV set may change from one sequence of images to another one of this content, and as the definition of the first step relies notably on the GBD describing the source color gamut of the mastering display device, this definition may change during the reproduction of this content, necessitating a re-computation in real time of the mapping of source colors during the display of sequences of images. Such a situation is still more critical when each image has its own source color gamut, i.e. when the source color gamut is not based on color characteristics of a mastering display device but based directly on the colors of this image.

In order to simplify the re-computing in real time of the definition of the first step so that less computational resource is required, and in order to ensure a similar quality of the first step as compared to the second step, some pre-computed information defining the second mapping of the second step, such as the mapping trajectories defining this second mapping, are used to define the first mapping of the first step as illustrated on FIG. 1 and as described in detail below as a non-limiting example.

We will now describe with more details how LUT1 characterizing the second step and LUT2 characterizing the third step are pre-computed.

As shown on FIG. 5, the second step is a gamut mapping operation from the UHDTV reference color gamut to the color gamut of the target display device. The UHTDV RGB reference color space is defined by the international standard ITU-R BT.2020 and described by a GBD stored on the color mapper. The GBD describing the target color gamut is also stored on the color mapper.

The second mapping of the second step can be of any gamut mapping type, for example the SGCK algorithm (sigmoidal lightness mapping with GCUSP and cusp knee scaling) such as described by Braun and Fairchild in their article "Image Lightness Rescaling Using Sigmoidal Contrast Enhancement Functions" published in the Journal of Electronic Imaging, Volume 8, No. 4, and discussed also by Zolliker, Datwyler, Simon in their article "On the Continuity of Gamut Mapping Algorithms" published in Color Imaging X: Processing, Hardcopy, and Applications, in the Proceedings of the SPIE, Volume 5667. Often, the type of gamut mapping will be chosen by the target display device maker according to his personal preferences. The pre-computation of LUT1 may be notably based on the following three operations illustrated on FIG. 4:

1. By applying the reference BT.2020 forward transform, transforming intermediate UHDTV R,G,B color coordinates representing intermediate colors in the reference BT.2020 RGB color space into intermediate CIE X,Y,Z coordinates according to ITU-R BT.2020, and then into intermediate CIE L,a,b coordinates according to CIE 1976 by applying a CIELAB forward transform able to transform any color coordinates representing a color in the CIEXYZ color space into color coordinates representing approximately the same color in the CIELAB color space;
2. By applying the SGCK algorithm to these intermediate CIE L,a,b coordinates, mapping these intermediate colors from the reference BT.2020 color gamut into the target color gamut, resulting in target L,a,b, coordinates. This step requires to transform the GBD representing the reference BT.2020 color gamut in the reference BT.2020 color space into a GDB representing this color gamut in the CIELAB space, and to transform the GBD representing the target color gamut in the target color space into a GDB representing this color gamut in the CIELAB space.

3. Transforming target L,a,b coordinates into target X,Y,Z coordinates according to CIE 1976 by applying a CIELAB inverse transform able to transform any color coordinates representing a color in the CIELAB color space into color coordinates representing approximately the same color in the CIEXYZ color space, and then transforming these target X,Y,Z coordinates into target UHDTV R,G,B coordinates according to ITU-R BT.2020 by applying a reference BT.2020 inverse transform able to transform any color coordinates representing a color in the CIEXYZ color space into color coordinates representing approximately the same color in the reference BT.2020 color space.

A LUT1 resulting from these three steps applied to a set of intermediate colors sampling the reference BT.2020 color space is stored on a memory of the computer platform. The advantage of pre-calculating LUT1 offline is that sophisticated gamut mapping techniques can be employed irrespective of their computational requirements.

We will now explain how LUT2 defining the third step is pre-computed. The aim of this third step is to perform a color re-encoding of the target colors. The target R,G,B color coordinates outputted by the second step above represents the target colors in the UHDTV RGB source color space. As illustrated on FIG. 6, by applying successively the reference BT.2020 forward transform and the target inverse transform to these target R,G,B color coordinates, target R,G,B color coordinates representing approximately the same target colors in the target RGB color space are obtained. The LUT2 resulting from these two successive color transformations applied to a set of targets colors sampling the reference BT.2020 color space is stored on a memory of the computer platform.

We will now describe with more details how the first mapping of the first step is defined advantageously in real time through information representing the second step above, more precisely how the first mapping of the first step is defined along mapping trajectories that are those of the second step above.

LUT1 which is stored on the computer platform represents the second mapping and implies mapping trajectories as follows: each mapping trajectory is defined, in the reference BT.2020 color space, as a straight line starting at an input color of this LUT1 and ending at the corresponding output color of this LUT1. Such straight lines are represented on FIG. 5, where the arrows correspond to the output colors. Any starting point of a mapping trajectory represents an input of LUT1, and the corresponding ending point of this mapping trajectory represents the corresponding output of this LUT1, such that this mapping trajectory represents a second mapping of the color represented by its starting point.

We will now show how the first mapping of any source color is defined along a mapping trajectory computed from a weighted average of mapping trajectories of the second mapping as defined above in reference to LUT1. Output colors of LUT1 that are the closest to this source color to first map are selected in the reference BT.2020 color space, and a weighted average of the mapping trajectories having ending points corresponding to these selected output colors is computed. It means that the mapping trajectories of the second mapping, therefore inferred by LUT1, are reused for the first mapping, therefore reducing advantageously the computational resources needed to define the first mapping. Another advantage is that the mapping trajectories of the second mapping are calculated by the above described gamut mapping algorithm, for example the SGCK algorithm, and carry thus certain characteristics depending on the type of gamut mapping. For example, some gamut mapping types use trajectories that do not change the hue of colors. Such a trajectory is difficult to define in a device dependent color space such as the reference BT.2020 color space. By reusing the mapping trajectories of the second mapping, the first mapping would also not change the hue of colors. By reusing the mapping trajectories of the second mapping for the first mapping, high quality characteristics—for example hue constancy—of the second mapping—that has been calculated offline can be transferred to the first mapping that is advantageously defined and calculated in real-time.

In order to reuse the trajectories defining the second mapping to define the first mapping, a series of equally spaced points $m_j$, j=0 . . . J−1 inside the reference UHDTV RGB color space are selected in a first operation of the first step, such that the whole reference color space is covered. For example, 216 points $m_j$ are selected having all combinations of R,G,B color coordinates with the values 0, 31, 63, 127, 191 and 255 assuming a bit depth of 8 bit. For each $m_j$ of these points representing a color in this color space and interpreted as an output of LUT1, a corresponding LUT1 input color is determined by known interpolation techniques applied to LUT1. This calculation corresponds to an inversion of LUT1. The point corresponding to this input color is called expansion point. A vector is drawn from the point $m_j$ to this expansion point. This vector is called LUT1 trajectory of point $m_j$. For each $m_j$ of said points, its LUT1 trajectory is calculated. As a whole, the mapping trajectories that will be used for the first mapping are defined in the reference color space such as those of the second mapping that are computed as described above in the reference color space.

Figure 7:
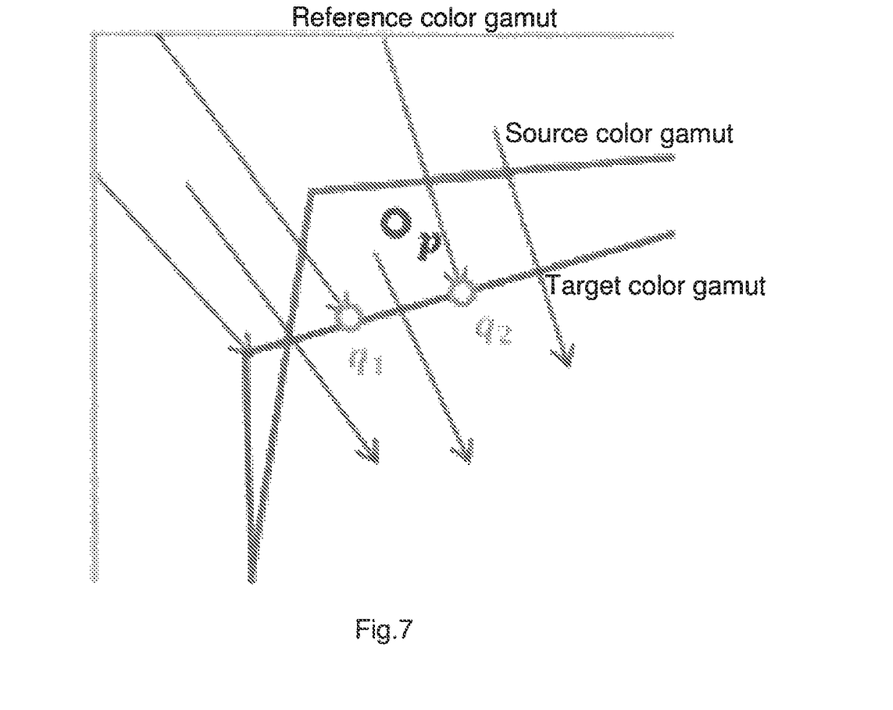
FIG. 7 illustrates a search for nearest neighbors of a point p representing a source color to first map, in a second operation of the first mapping of the main embodiment illustrated on FIG. 1.

The second operation of the first step is a search for nearest neighbors. FIG. 7 illustrates a point p that corresponds to an incoming UHDTV source color received by the receiver and forwarded to the color mapper. For this point p, the I nearest neighbors $q_i$, 0=1 . . . I−1 among said equally distant points $m_j$ of the series above are searched. FIG. 7 shows as an example two nearest neighbors $q_1$, $q_2$.

Figure 8:
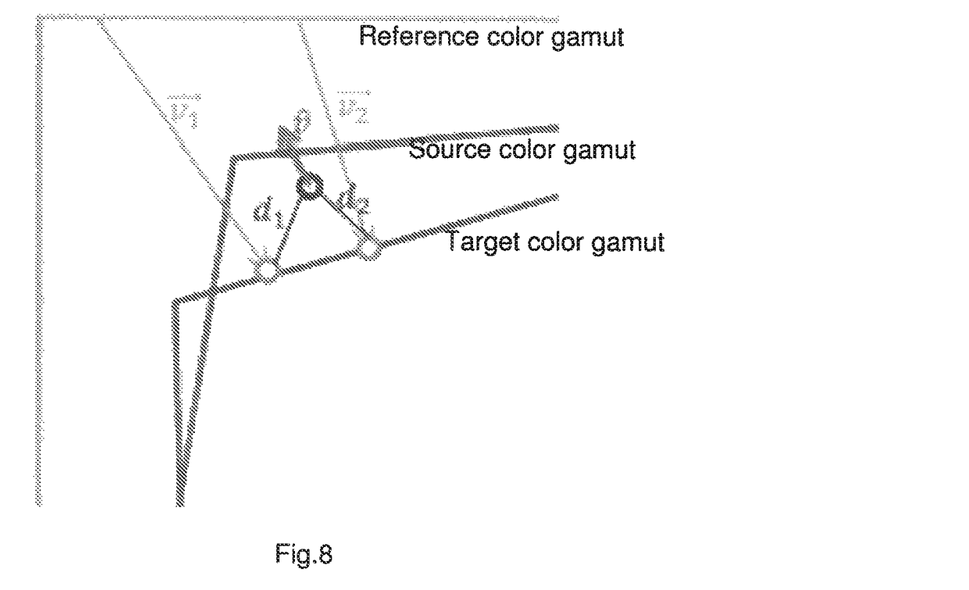
FIG. 8 illustrates calculation of a unit expansion vector for an incoming source color represented by point p, in a third operation of the first mapping of the main embodiment illustrated on FIG. 1.

The third operation of the first step is the calculation of a unit expansion vector for this incoming UHDTV source color. As shown in FIG. 8, each nearest neighbor $q_i$ has its associated LUT1 trajectory $\vec{v}_i$ calculated above at the first operation. For each neighbor $q_i$, the distance $d_i$ to the point p is calculated according to $d_i=|p-q_i|$. FIG. 8 shows as example two distances $d_1$, $d_2$ to two neighbors $q_1$, $q_2$. For each point p, an expansion vector $\vec{u}$ is computed as a weighted and normalized average of the $\vec{v}_i$ of the I nearest neighbours $q_i$ according to:

$$\vec{u} = -\sum_{i=0}^{I-1} \frac{D-d_1}{D} \vec{v}_i \text{ with } D = \sum_{i=0}^{I-1} d_i$$

and then normalized to a unit expansion vector according to $\vec{v}=\vec{u}/|\vec{u}|$. Other interpolation methods such as nearest neighbor or tetrahedral interpolation could be employed, too.

Figure 9:
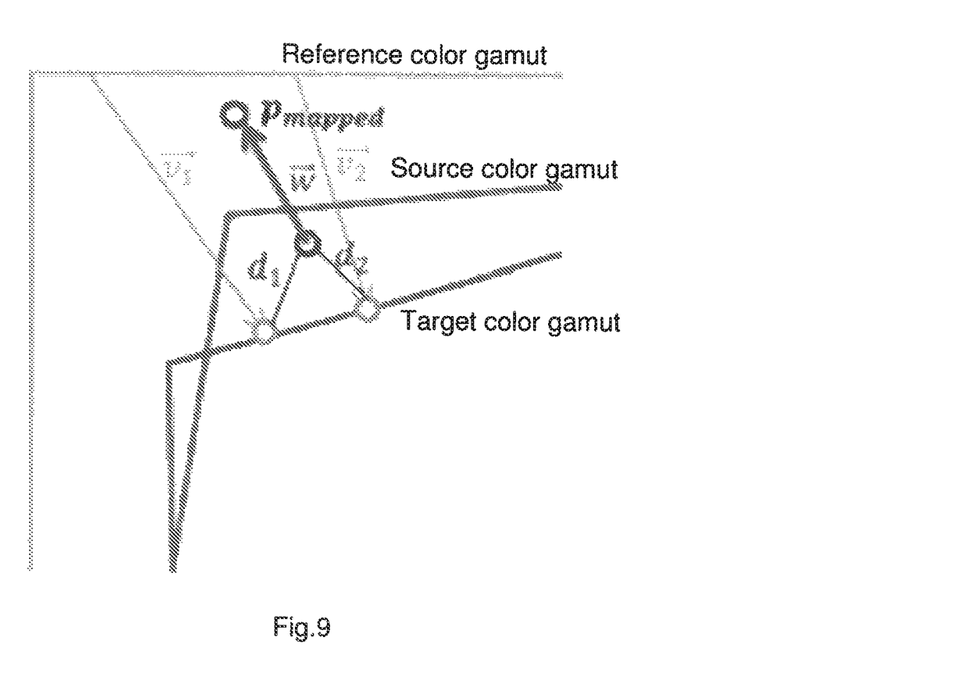
FIG. 9 illustrates calculation of a full expansion vector $\vec{t}$ for a point p within the source color gamut, representing a source color, in a fourth operation of the first mapping of the main embodiment illustrated on FIG. 1.

The fourth operation of the first step is the calculation of a full expansion vector $\vec{t}$ for each point p. For this reason, any source color represented by a point p in the source color gamut is expanded to a point $p_{mappped}$ in the UHDTV BT.2020 reference color gamut such as shown in FIG. 9 by using a simple known method from state of the art. We can choose for instance a method that allows to map a color p within the mastering source color gamut onto an expanded color $p_{mappped}$ within the BT2020 reference color gamut using simply two linear matrices. The advantage of selecting such a method for this fourth operation is that it requires low computational resources. This expanded color $p'=p_{mappped}$ might have some derivations in hue. Therefore, only the amplitude of expansion is used in order to calculate a full expansion vector $\vec{t}$ for each point p according to:

$$\vec{t} = |p'-p| \vec{u}$$

and the color p will be mapped to the intermediate color $p''=p+\vec{t}$. If the intermediate color is located outside of the BT.2020 reference color gamut, it will be clipped to be located inside or at the boundary of this gamut.

As a conclusion concerning the definition of the first mapping of the first step as summarized on FIG. 3, the first operation can be advantageously pre-calculated such as to provide a network of mapping trajectories for points $m_j$ that are stored on a memory of the computer platform. The second, third and fourth operations as defined above of the first step can be advantageously implemented for each incoming source color to map in real time as they require low computational resources.

The first, second and third steps of the embodiment of the method according to the invention are now defined.

Now, each source color received by the receiver and forwarded to the color mapper,
- is first mapped in real time as defined above from the mastering source color gamut into the BT.2020 reference device color gamut, resulting in an intermediate color,
- using LUT1 and known interpolation methods, is then second mapped in real time from the BT.2020 reference color gamut into the target color gamut, resulting in a target color,
- using LUT2 and known interpolation methods, is then transformed in real time to be expressed in the target color space of the target display device.

The target colors as transformed are then sent to the target display device to control it such as to reproduce the received colors.

Without departing from the invention, LUT1 and LUT2 can be combined into a global LUT1-2 stored on the computer platform and then applied in real time to the intermediate colors provided by the first mapping.

Thanks to the precalculations of LUT1 defining the second mapping and of LUT2, thank to the re-use of the mapping trajectories derived from LUT1 to define the first mapping, the computational resources needed to implement the mapping method of the invention are low and this mapping method can be easily implemented in real time, even when the source color gamut of the images to display changes during the display.

As described above, the computation of the first step is derived from the trajectories included in LUT1 of the second step. This means that the selection of a "good" (e.g. hue-preserving) gamut mapping approach in the second step is likely to provide "good" trajectories for the first step, whereas a simple mapping used in the second step can produce badly performing trajectories. On the one hand, the performance of the first step depends thus on the quality of the second step. On the other hand, and this is a possible advantage of the invention, any sub-optimal trajectories used in the compression operation of the second step will be reused in the first step. Hereby, any artifact produced in the second step due to suboptimal trajectories will be partly advantageously compensated by the first step.

As a whole, the mapping method as embodied above employs offline information (LUT 1, defining a given gamut mapping strategy) about the target display device that will be used to display images of a content, and online information (the chromaticity of the primaries) about the reference display device(s), here the mastering display, used for the creation of this content, to perform an initial color expansion of the image in the reference color gamut which is provided online (Rec. 2020) that such that the images of the content as displayed better fits the entire gamut capabilities of the target display device than without such a mapping. Information representing the reference color gamut, the reference forward and inverse transform that are necessary to implement the method as embodied above, may be provided online as metadata both at the target display device side together with the incoming images of the content to display.

A first specific case is when the second step employs color clipping. In this case, several intermediate colors might be mapped by LUT1 to a single output color. Therefore, the inversion of LUT1 that defines above the first operation of the first step may be problematic. This situation can be handled by calculating the input color related to an output color of LUT1 from an average of these several intermediate colors.

Another specific case is when the second step employs full color preservation. In this case, intermediate colors might be mapped by LUT1 on the same intermediate colors. No mapping trajectory can be extracted in this case for this color. Therefore if a LUT1 trajectory is too small, it will not be used, or it will be used with less weight in the calculation of the expansion vector during the third operation of the first step.

Another specific case is LUT1 trajectories for colors outside the mastering color gamut. During the inversion of LUT1 in the first operation of the first step, those colors need to be extrapolated. This might result in extrapolated expansion vectors near the border of the color gamut of the mastering display. These vectors might be excluded from or used with less weight in the averaging of the third operation of the first step.

Although the illustrative embodiments of the invention have been described herein with reference to the accompanying drawings, it is to be understood that the present invention is not limited to those precise embodiments, and that various changes and modifications may be effected therein by one of ordinary skill in the pertinent art without departing from the invention. All such changes and modifications are intended to be included within the scope of the present invention as set forth in the appended claims.

The invention claimed is:

1. A method comprising for at least one source color of a source image and in a same reference color space:
    first mapping said at least one source color from a source color gamut into a reference color gamut along a first mapping trajectory, resulting in a corresponding intermediate color different from said at least one source color,
    second mapping said intermediate color from said reference color gamut into a corresponding target color gamut along a second mapping trajectory, resulting in a corresponding target color different from said intermediate color and from said at least one source color, wherein said first mapping trajectory is defined as being approximately identical to aid second mapping trajectory, wherein a direction of said first mapping is opposed to a direction of said second mapping along the first and second trajectory, and wherein said reference color gamut differs from said source color gamut and from said target color gamut.

2. The method of mapping according to claim 1, wherein said second mapping is defined by a LUT comprising a series of pairs of input colors and corresponding output colors representing said colors in said reference color space, wherein each of these pairs having an input color and a corresponding output color defines a mapping trajectory for the second mapping of this input color and for the first mapping of this output color.

3. The method of mapping according to claim 1, wherein said first mapping is performed such that at least one of said intermediate colors does not belong to said source color gamut.

4. The method of mapping according to claim 1 wherein said second mapping is performed such that at least one of said intermediate colors does not belong to said target device color gamut.

5. The method of displaying at least one image on a target display device having a target color gamut, comprising:

receiving source colors of said at least one image represented in a reference color space associated with a reference color gamut, mapping at least one of said source colors from a source color gamut into said target color gamut according to the mapping method of claim 1, resulting in a corresponding target color which is then represented in said reference color space, transforming said representation of these target colors in said reference color space into representations of the same colors in the target color space of said target display device, controlling said target display device by said target colors as represented in said target color space.

6. The method of displaying at least one image on a target display device according to claim 5, wherein the source color gamut of each image is content dependent and varies according to said images to display, wherein the first mapping from said source color gamut into said reference color space is defined in dependence to said varying source color gamuts in real time during said displaying, and wherein the second mapping from said reference color space into said target color space is predefined before said displaying.

7. An image processing device comprising at least one processor configured for, for at least one source color of a source image and in a same reference color space:

first mapping said source color from a source color gamut into a reference color gamut along a first mapping trajectory, resulting in a corresponding intermediate color different from said source color, second mapping said intermediate color from said reference color gamut into a target color gamut along a second mapping trajectory, resulting in a corresponding target color different from said intermediate color and from said source color, wherein said first mapping trajectory is defined as being approximately identical to said second mapping trajectory, wherein the direction of said first mapping is opposed to the direction of said second mapping along the first and second trajectory, and wherein said reference color gamut differs from aid source color gamut and from said target color gamut.

8. A display device having a target color gamut, comprising:

a receiver configured to receive source colors of at least one image represented in a reference color space, an image processing device according to claim 7 with the at east one processor being further configured for transforming a representation of said targets colors in said reference color space into a representation of the same targets colors in the target color space of said target display device, a controller for controlling said display device by said target color represented in said target color space such as to display said target color.

* * * * *